United States Patent

Chan

[11] 4,190,792
[45] Feb. 26, 1980

[54] POSITIONING CONTROL SYSTEM

[76] Inventor: Vincent Chan, 24 Chang An W. Rd., 6th Fl., Rm 601, Taipei, Taiwan

[21] Appl. No.: 884,754

[22] Filed: Mar. 9, 1978

[51] Int. Cl.² ............................................. G05B 1/06
[52] U.S. Cl. .................................... 318/663; 318/9; 318/666
[58] Field of Search .................. 318/9, 14, 663, 666

[56] References Cited

U.S. PATENT DOCUMENTS

| Re. 26,404 | 6/1968 | Lunn et al. | 318/663 X |
| 3,297,925 | 1/1967 | Masel | 318/663 |
| 3,467,900 | 9/1969 | Benton | 318/666 X |
| 3,470,431 | 9/1969 | Jones | 318/663 |
| 3,581,180 | 5/1971 | Russell et al. | 318/663 X |
| 3,700,994 | 10/1972 | Gopfert | 318/663 X |

Primary Examiner—B. Dobeck
Attorney, Agent, or Firm—Kenneth S. Goldfarb

[57] ABSTRACT

A position control system capable of relatively great positioning accuracy includes a universal electric motor and a gear box for transferring the motion of the motor and an object being positioned. The position control system includes a conductive brush which moves with the object being positioned and which slides on a plurality of electrical contacts which are part of a control circuit the control circuit includes a plurality switches for selection of the desired position of the object and resistance networks which serve to apply various values of voltage to voltage sensitive motor speed and direction controls which in turn control the speed direction and stopping of the motor hereby controlling the position of the object.

4 Claims, 13 Drawing Figures

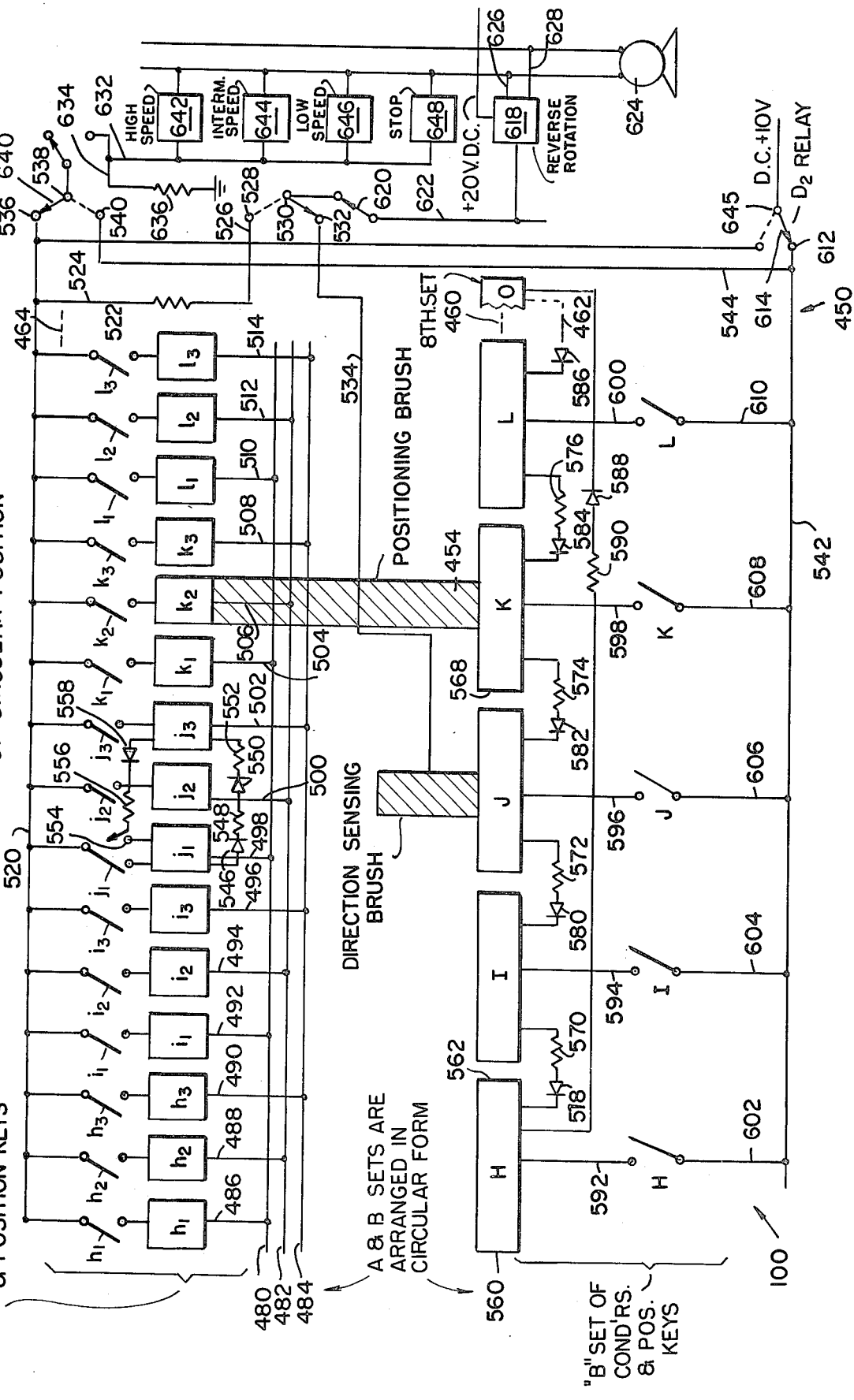
FIG.3 POS. & DIRECTIONAL CONTROL SYSTEM OF CIRCULAR POSITION

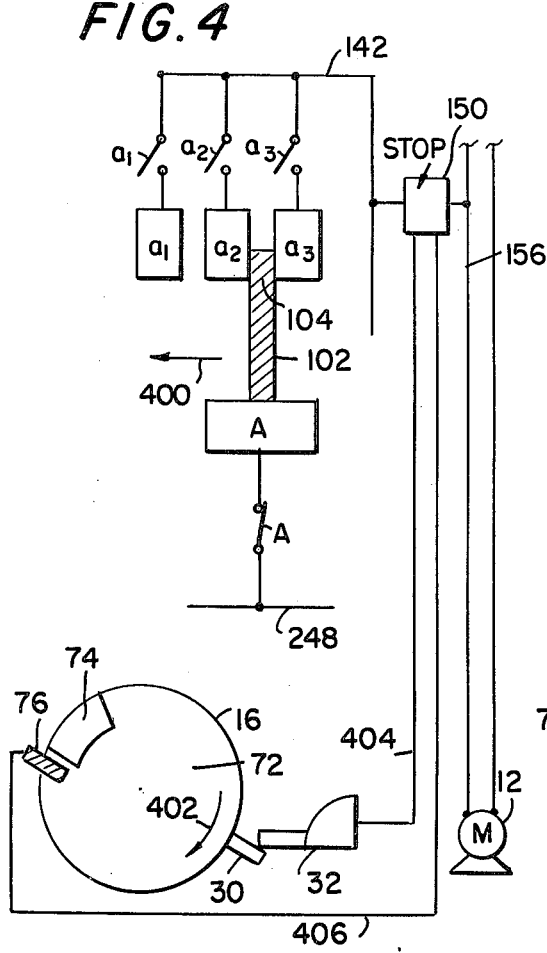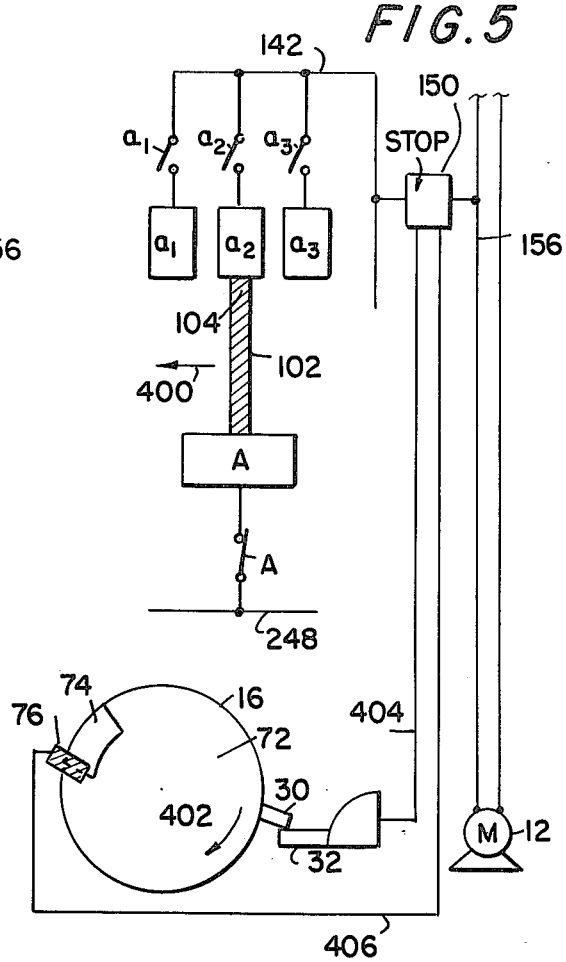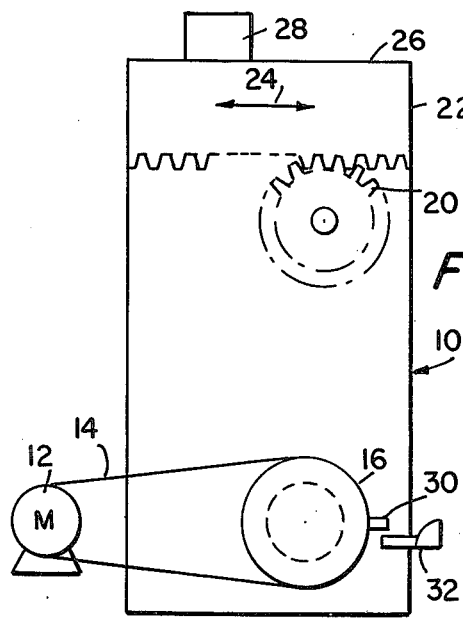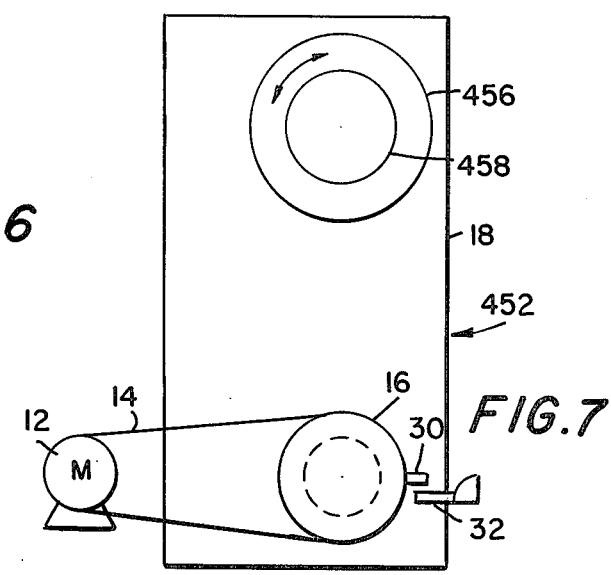

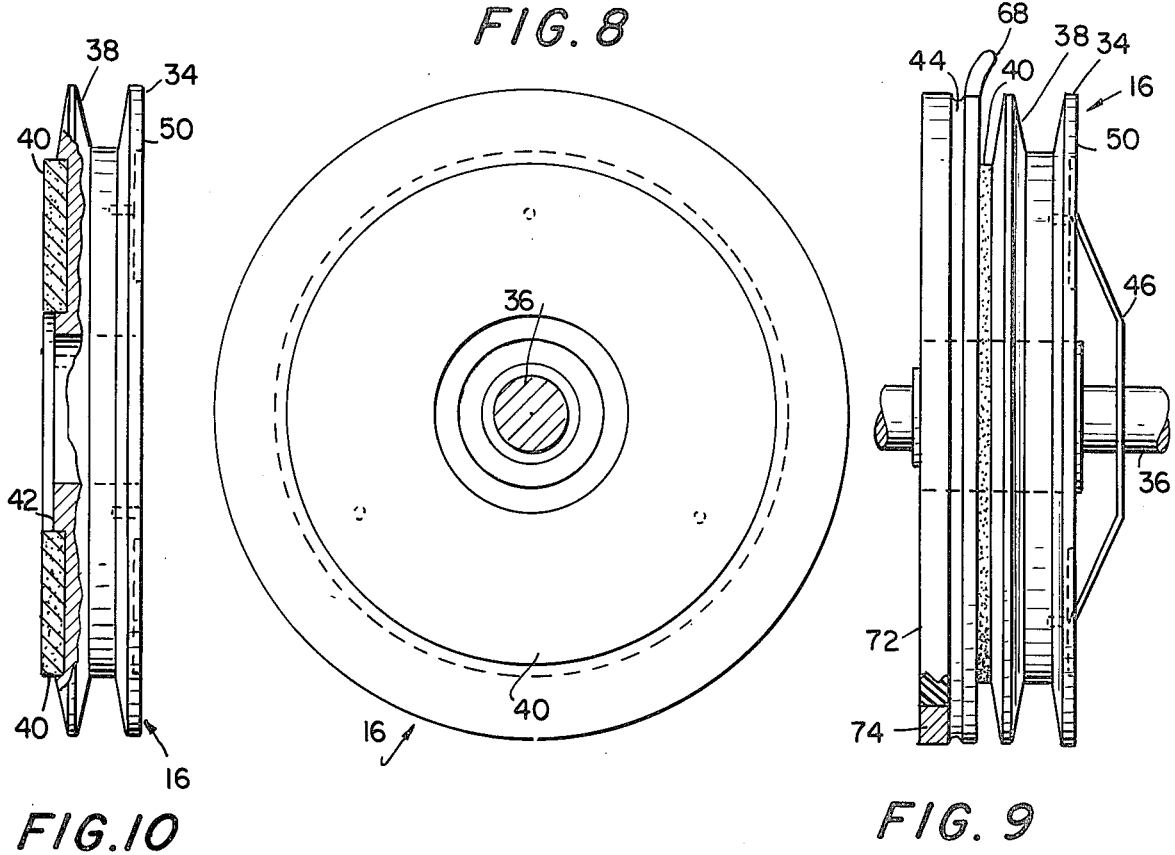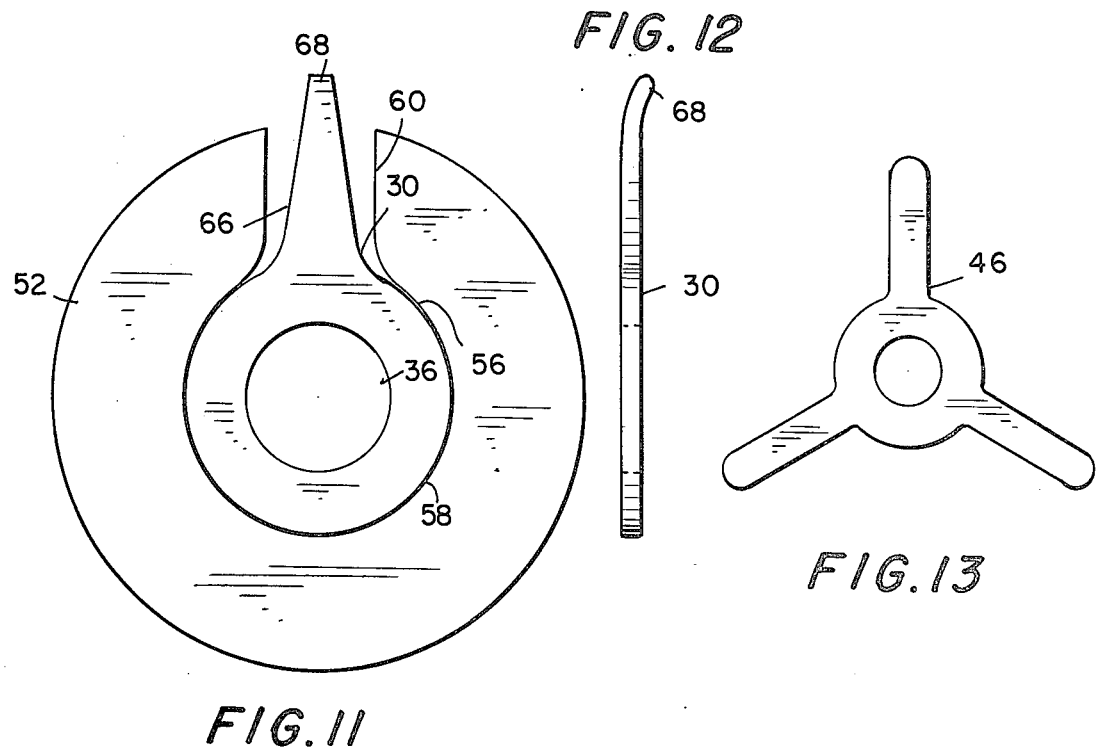

POSITIONING CONTROL SYSTEM

BACKGROUND OF THE INVENTION

Conventional electro-mechanical positioning systems usually comprise either a closed-loop analogy servo system or a digital stepper motor system. Closed-loop analog servo systems are subject to disadvantages such as positioning error and the accumulation of errors during extended periods of operation. Digital stepper motor systems require a relatively complex digital electronic system to generate the proper pulse signals and often require the incorporation of mechanical or electrical damping in the system to prevent oscillation of the load.

SUMMARY OF THE INVENTION

The present invention overcomes the disadvantages of the prior art by providing a position cntrol system which can position an object with great accuracy without the use of either a closed-loop analog servo system or a digital stepper motor system. The position control system according to the present invention comprises a universal motor, a mechanical device for transferring the motion of the motor, such as a gear box, a movable brush which moves with the object being positioned and which is in sliding contact with a plurality of contacts which are part of a control circuit. In addition to the plurality of contacts, the control circuit includes a set of switches for selection of the desired position of the object and resistance networks which apply various values of voltage to voltage sensitive motor speed and direction controls, which in turn, control the speed, direction and the stopping of the universal motor. The position control system permits an object to be driven to a preselected linear position and features a novel pulley which is used to compensate for backlash in the gear box thereby eliminating backlash as a source of positioning errors.

An alternative embodiment of the invention features rotary motion position and direction control and operates in a manner generally similar to the linear position control embodiment described above.

It is a principal object of the present invention to provide a position control system which features the use of a universal electric motor which is controlled by a novel control circuit.

Another object of the present invention is to provide a position control system which eliminates the need for a stepper motor system or an analog servo system.

Another object of the present invention is to provide a position control system capable of relatively great positioning accuracy.

Another object of the present invention is to provide a position control system which eliminates accuracy errors due to backlash.

Another object of the present invention to provide a position control system which is capable, in alternative embodiments, of providing control of linear motion and rotational motion.

Still another object of the present invention is to provide a position control system which comprises relatively few components which are economical of manufacture.

These, together with various ancillary objects of the present invention are obtained by this position control system, preferred embodiments being shown in the accompanying drawings by way of examplanation only, wherein:

BRIEF DESCRIPTION OF THE DRAWINGS

FIG. 3 is an electrical schematic diagram of an alternative embodiment of the position control system of FIG. 1 which provides position and direction control of rotation motion;

FIG. 4 is a fragmentary electrical and mechanical schematic diagram showing the operation of the position of the position control system of FIG. 1;

FIG. 5 is a fragmantary electrical and mechanical shematic diagram similar to FIG. 4 showing the position of the various components after approximately one revolution of the pulley;

FIG. 6 is an elecvation view showing the mechanical components of the position control system of FIG. 1;

FIG. 7 is an elevation view showing the mechanical components of the position control system of FIG. 3;

FIG. 9 is a side view of the pulley of FIG. 8;

FIG. 10 is a side view of the pulley wheel which is part of the pulley of FIG. 9;

FIG. 11 is a front view of the lock plate and the lock key which are part of the pulley of FIG. 9;

FIG. 12 is a side view of the lock key of FIG. 11, and

FIG. 13 is a front view of a leaf spring which is part of the pulley of FIG. 9.

DETAILED DESCRIPTION OF THE INVENTION

Figure 1:
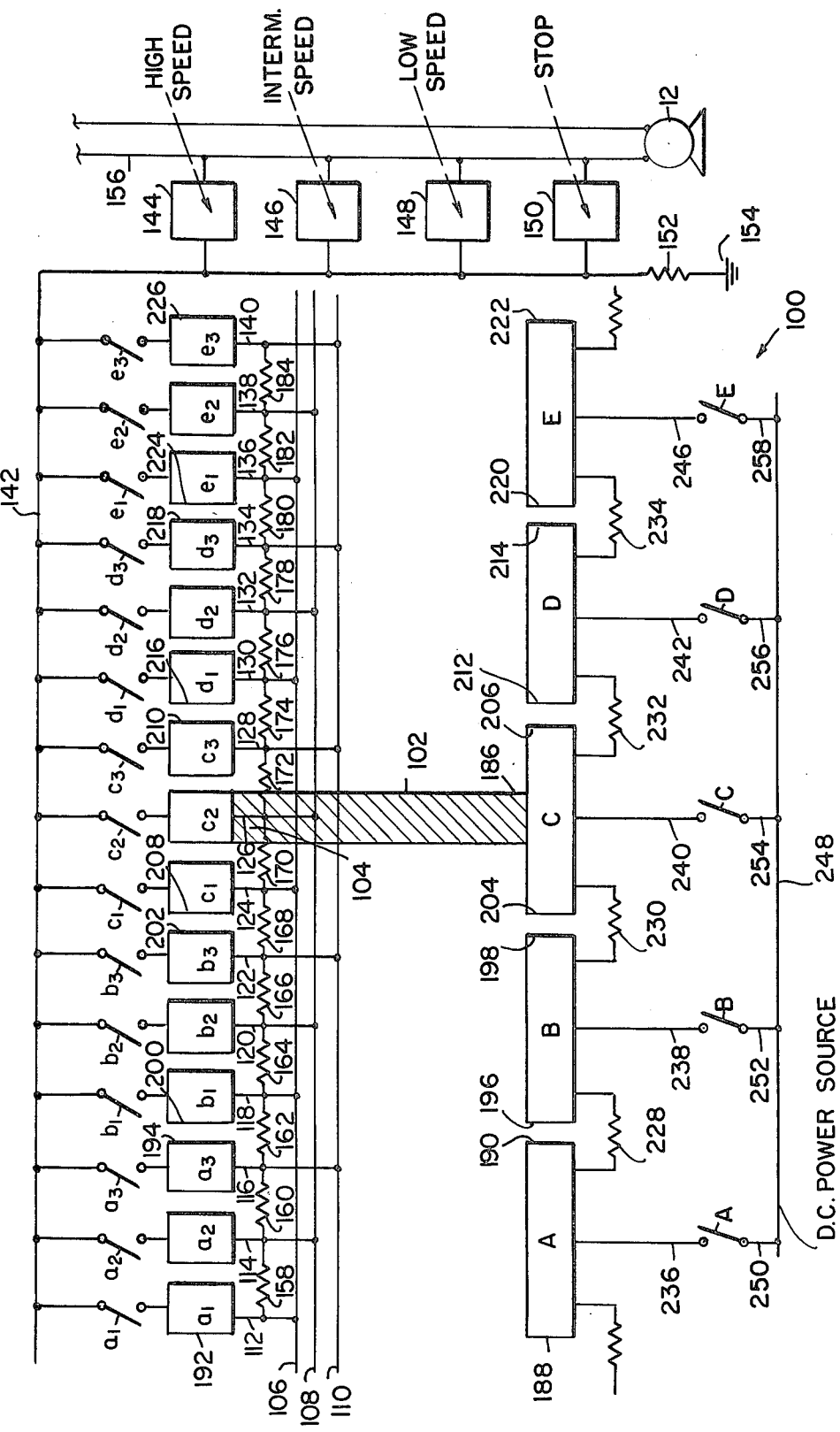
FIG. 1 is an electrical schematic diagram of a position control system, according to the present invention, which provides linear motion position control.

With continuing reference to the accompanying drawing, wherein like reference numerals designate similar parts throughout the various views, reference numeral 10 is used to generally designate a position control system in accordance with the present invention. There is shown in FIG. 6 a first embodiment of the position control system 10 which is disposed for linear direction and position control. The position control system 10 comprises a universal electric motor 12 which is connected with a drive belt 14 and a pulley 16 to a gear box 18. The pulley 16 forms the input to the gear box 18 with the output of the gear box 18 being the pinion gear 20 which is in mesh with the rack 22. Rotation of the pinion gear 20 causes translation of the rack 22 as indicated by the arrow 24. The upper portion 26 of the rack 22 is flat and an object 28 which is to be subjected to controlled linear motion in accordance with the present invention is attached to the upper portion 26 of the rack 22 using conventional attachment means. Projecting from the pulley 16 there is shown a stop key 30 which comes into contact with a stopper 32 operation of which will be described presently in connection with the stopping control portion of the position control system 10.

The gear box and the stopping control portion of the position control system 10 control the over all precision or accuracy of the position control system 10. The gear box 18 may have a reduction factor which is equal, by way of example, to 100:1. If the rotation of the pulley 16, for example, is considered equivalent to one step which is equal to 1 m.m. than the rotation of the pinion gear 20 would be equivalent to 1/100 m.m. If the stop key 30 on the pulley 16 and the stopper 32 stop the pulley 16 within one revolution of the pulley 16 there, except for the effects of backlash in the gear box 18, the accuracy of the positioning control system 10 in positioning the rack 22 would be 1/100 mm.

The details of the mechanical arrangement of the pulley 16 are best shown in FIGS. 8–13. The pulley 16 includes a stop key 30 which is disposed to rotate slightly with respect to the pulley 16 to compensate for backlash in the gear box 18 thereby improving the accuracy of the position control system 10. The pulley 16 includes a pulley wheel 34 which is rotatably mounted on a shaft 36 and which has a circumferential groove 38, which accepts there drive belt 14. The pulley wheel 34 includes a slip-friction plate 40 which is attached to the surface 42 as is shown in FIG. 10. The pulley wheel is urged into contact with the base plate 44 by the leaf spring 46 which bears against the surface 50. If the torque between the base plate 44, which is connected to the shaft and the pulley wheel 34 exceeds a preselected limit, the slip-friction plate 40 permits the pulley wheel 34 to rotate relative to the base plate 44 thereby preventing damage to the position control system 10.

A lock plate 52 is attached to the base 44 plate, facing the surface 54 of the base plate 44. The lock plate 52 has a opening 56 which has a generally circular portion 58 and a slot portion 60. A stop key 30 is provided which is rotatably mounted on the shaft 36 and which has a circular portiion 64 which fits in the circular portion 58 of the opening 56 and can rotate with respect to the lock plate 52 and a projecting portion 66 which fits within and is generally narrower than the slot portion 60. The stop key 30 may rotate with respect to the lock plate 52 within the limits of the slot portion 60 for the purpose of compensating for backlash in the gear box 18. The tip of the stop key 62 projects beyond the outer surface 70 of the lock plate 52 for the purpose of contacting the stopper 32 in a manner which will be presently described.

The pulley 16 for there includes a electrically insulated plate 72 which is attached to the shaft 36 and on the insulated plate 72 there is mounted a ground copper block 74 located at a selected position so that when the stop key 30 is stopped by the stopper 32 the ground copper block 74 will contact a stop signal brush 76 in order to send a stop signal to the motor 12, as is shown in FIGS. 4 and 5. The stop signal brush 76 may be mounted on the gear box 18 or any equivalent fixed support. The insulated plate 72 may be made of any one of a number of well known electrically non-conductive materials.

Referring now to FIG. 1, the control circuit 100 comprises a moveable brush 102, which may be made of carbon, which is attached by known means, which are not shown, to the movable rack 22 and which moves with the rack 22 a linear manner. The upper portion 104 of the brush 102 is in sliding contact with a plurality of conductors which are disposed in a linear manner and which, for purpose of explanation, are designated $a_1$, $a_2$, $a_3$, $b_1$, $b_2$, $b_3$, $c_1$, $c_2$, $c_3$, $d_1$, $d_2$, $d_3$, $e_1$, $e_2$, and $e_3$ in FIGS. 1 and 2. It is to be understood that the selection of 15 conductors in the description which follows is by way of example only. The width of the upper portion 104 of the brush is, in general, equal to the width of a single one of the above plurality of conductors. The conductors $a_1$, $a_2$, $a_3$, $b_1$, $b_2$, $b_3$, $c_1$, $c_2$, $c_3$, $d_1$, $d_2$, $d_3$, $e_1$, $e_2$, and $e_3$ are connected to leads 106, 108 and 110 in the following manner.

Conductor $a_1$ is connected to lead 106 via lead 112,
Conductor $a_2$ is connected to lead 108 via lead 114,
Conductor $a_3$ is connected to lead 110 via lead 116,
Conductor $b_1$ is connected to lead 106 via lead 118,
Conductor $b_2$ is connected to lead 108 via lead 120,
Conductor $b_3$ is connected to lead 110 via lead 122,
Conductor $c_1$ is connected to lead 106 via lead 124,
Conductor $C_2$ is connected to lead 108 via lead 126,
Conductor $c_3$ is connected to lead 110 via lead 128,
Conductor $d_1$ is connected to lead 106 via lead 130,
Conductor $d_2$ is connected to lead 108 via lead 132,
Conductor $d_3$ is connected to lead 110 via lead 134,
Conductor $e_1$ is connected to lead 106 via lead 136,
Conductor $e_2$ is connected to lead 108 via lead 138 and
Conductor $e_3$ is connected to lead 110 via lead 140.

Each of the conductors $a_1$, $a_2$, $a_3$, $b_1$, $b_2$, $b_3$, $c_1$, $c_2$, $c_3$, $d_1$, $d_2$, $d_3$, $e_1$, $e_2$ and $e_3$ is connected to a switch or key with the keys being designated for purpose of explaination key $a_1$, key $a_2$, key $a_3$, key $b_1$, key $b_2$, key $b_3$, key $c_1$, key $c_2$, key $c_3$, key $d_1$, key $d_2$, key $d_3$, key $e_1$, key $e_2$ and key $e_3$ with key $a_1$, corresponding to conductor $a_1$, key $a_2$ corresponding to conductor $a_2$ and so on in order.

The keys $a_1$, $a_2$, $a_3$, $b_1$, $b_2$, $b_3$, $c_1$, $c_2$, $c_3$, $d_1$, $d_2$, $d_3$, $e_1$, $e_2$, and $e_3$ are each connected to lead 142 which in turn, is connected to voltage sensitive motor speed controls 144, 146, 148 and 150, in order stated, and to a resistor 152 which is connected to ground 154. The resistor 152 may have a volue, by way of example, of 10 k ohms. The voltage sensitive motor speed controls 144, 146, 148 and 150 are each connected to the motor 12 via lead 156. The voltage sensitive motor speed controls 144, 146, 148 and 150 are of a known type and are disposed, respectively, to cause the motor 12 to operate at high speed, intermediate speed or to stop, responsive to the voltage present in the lead 142.

Connected between each adjacent pair of the conductors $a_1$, $a_2$, $a_3$, $b_1$, $b_2$, $b_3$, $c_1$, $c_2$, $c_3$, $d_1$, $d_2$, $d_3$, $e_1$, $e_2$ and $e_3$ there is connected a resistor 158, 160, 162, 164, 166, 168, 170, 172, 174, 176, 178, 180, 182, and 184 each of which may have a valve, by way of example, of 2 k ohms.

Figure 2:
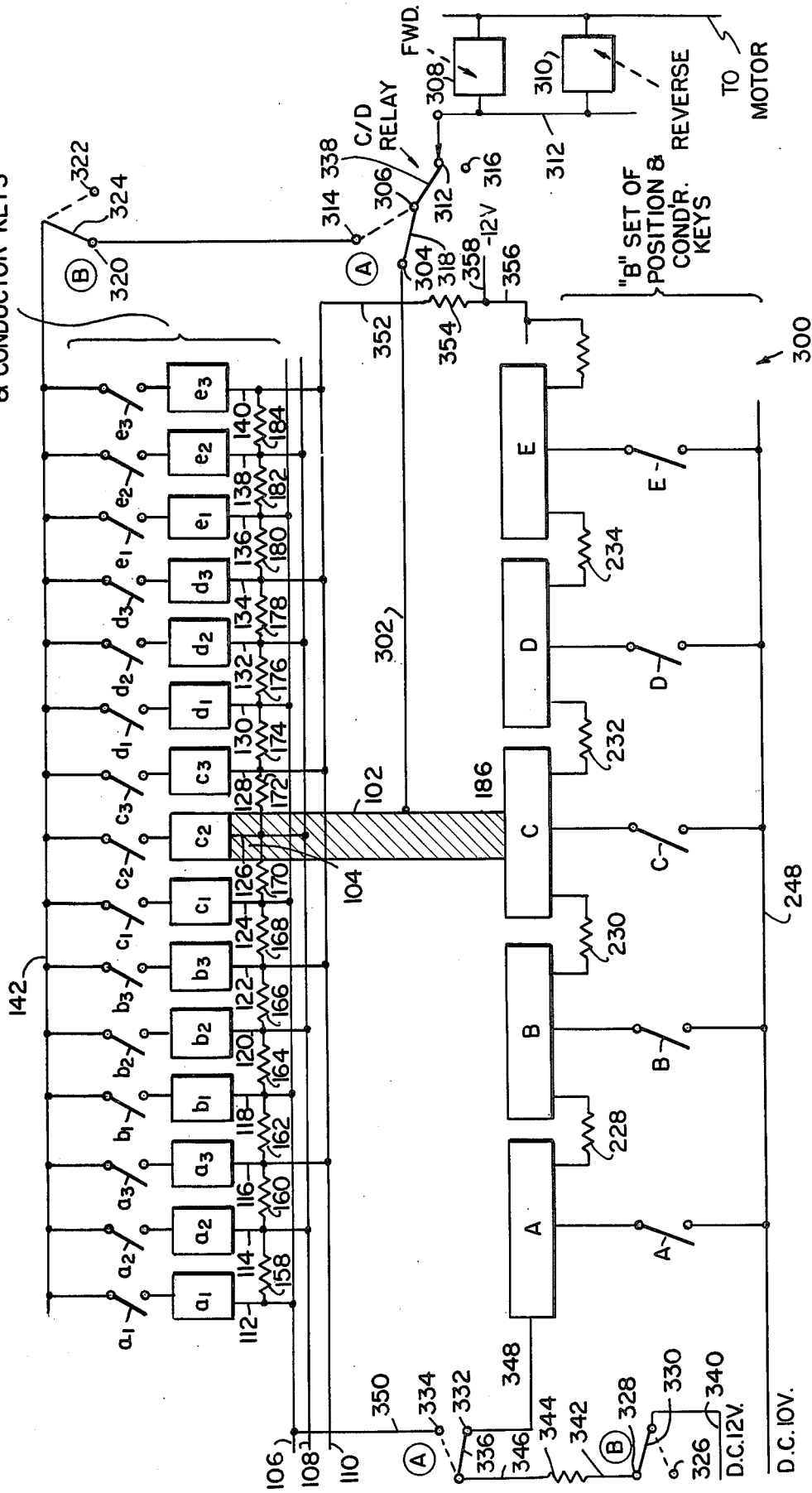
FIG. 2 in an electrical schematic diagram according to FIG. 1 showing additional components which are related to linear motion direction control.

The lower portion 186 of the brush 102 is in sliding contact with a plurality of conductors which are disposed in a linear manner and which, for the purposes of explaination, are designatre in FIGS. 1 and 2 as conductors A, B, C, D and E. It is to be understood that the selection of five conductors is by way of example only, however, the size and spacing of the conductors is such that the ends 188 and 190 of conductor A are in general alignment with opposing ends 192 and 194 conductor $a_1$ and $a_3$. In a similar manner, ends 196 198 of conductor B are in general alignment with opposing ends 200, 202 of conductors $b_1$ and $b_3$, ends 204, 206 of conductor C are in general alignment with opposing ends 208, 210 of conductors $c_1$ and $c_3$, ends 212, 214 of conductor D are in general alignment with opposing ends 216, 218 of conduttors $d_1$ and $d_3$ and ends 220, 222 of conductor E are in general alignment with opposing end 224, 226 of conductors $e_1$ and $e_3$. The arrangement of the conductors is such that, for example, when the lower portion of the brush 186 is in alignment with the edge 188 of the conductor A, the upper portion of the brush is in contact with conductor $a_1$ and when the lower portion 186 of the brush 102 is in contact with the edge 190 of the conductor A, the upper portion 104 of the brush 102 is in contact with the conductor $a_3$.

In the embodiment of the invention shown in FIGS. 1, 2 and 3 three conductors designated by lower case letters have been provided for each conductor designated by an upper case letter. It is understood that the selection of three conductors is not a limitation and that a different number of conductors may be selected with a suitable change in the number of leads and corresponding components without departing from the scope of the present invention.

Connected between each adjacent pair of conneectors A, B; B,C; C,D and D, E there is a resistor 228, 230, 232 and 234 each of which may have a value, by way of example, of 10 k ohms.

Each of the conductors A, B, C, D and E is connected to one of a plurality of keys via a lead 236, 238, 240, 242, 246, respectively, with the keys being designated key A, key B, key C, key D and key E in FIGS. 1 and 2 with key A corresponding to connector A, key B corresponding to connector B and so on in order stated. Keys A, B, C, D and E are each connected to be lead 248 via leads 250, 252, 254, 256, 258, respectively. The lead 248 is connected to a 10 volt source of D C power.

The operation of the circuit of the position control system 10 will be described with reference to FIGS. 1, 2, 3, 4 and 5. The operation of the system 10 for linear motion position control, linear motion direction control and stopping will be described in turn.

FIG. 1 shows the portion of the control circuit 100 which is active during the operation of the position control system 10 for linear motion position control. In FIG. 1 the brush 102 is shown in contact with conductor $c_2$ and conductor C. This position of the brush 102 will be designated $Cc_2$ for purpose of explanation. It is assumed, for the purpose of explaination, that it is desired to move the rack 22 to which the brush 102 is connected, to a position in which the brush 102 will be in contact with conductor $a_3$ and conductor A. In accordance with the previous method of designation, this position is designated as A $a_3$. To move the rack 22 to position A$a_3$, first key A is closed, then key $a_3$ is closed. This will send current from the lead 248, which is connected to a 10 volt D C power source, through key A, resistor 228, contact B, resistor 230, contact C, brush 102, contact $c_2$ lead 108, lead 114, resistor 160, contact $a_3$ and lead 142 in order stated. The voltage sensed by the voltage sensitive motor speed controls 144, 146, 148 and 150 may be, for example, in the order of 3.33 volk, which would control the motor 12 to make the rack 22 and the brush 102 move at medium speed toward contact B. When the brush 102 comes into contact with contact B resistor 230 is no longer active in the circuit and the overall circuit resistance is lowered. When the voltage changes to approximately 5 volts the rack 22 and the brush 102 comes into contact with contacts A and $a_3$ the voltage sensed by the motor speed controls sizes to 10 volts and this activates the stop control to stop the motion of the rack 22. The operation of the stop control will be presently described in detail.

Referring now to FIG. 2, the circuit 300 shown is identical to that shown in FIG. 1 and described above with the addition of circuit components which relate to the operation of the circuit 300 for position control. The additional components include a lead 302 which connects the brush 102 with contact 304 of C/D relay 306. The C/D relay 306 is connected to a pair of voltage sensitive motor direction controls 308 and 310, via lead 312. The voltage sensitive motor direction controls 108 and 310 which are of a known type, are connected to the motor 12 in FIG. 1 in a conventional manner, which is not shown. The voltage sensitive motor direction control 310. Labeled "reverse" in FIG. 2 is adapted for driving the motor 12 a reverse direction upon sensing a relatively high or positive voltage and the voltage sensitive motor direction control 308 labeled "forward" in FIG. 2 is adapted for driving the motor 12 in a forward direction upon sensing a relatively low or negative voltage. The C/D relay 306 includes: Contacts 304, 312, 314 and 316 and ornature 318, contacts 320 and 322 and arnature 324, contacts 326. For convenience the following contact pairs are labeled A in FIG. 2: 304 and 314, 332 and 334 and the following contact pairs are labeled B: 320 and 322, 326 and 328. Contact 304 is connected to contact, 312 via lead 338. When the armature 318 is in contact with the contact, 304 the lead 302 is connected to the lead 312.

A 12 volt source of D C power is connected to a lead 340 which is connected in turn via the arnature 330 and contact 328 to a lead 342 and a resistor 344, which may have a value, by way of example, of 50 k ohms. A lead 346 connects the resistor 344 to arnature 336 and then alternatively depending on the position of the arnature 336, to contact 332 and to the lead 348 which is connected to conductor A or to lead 350 which is connected to the lead 106. Lead 352 is connected to the resistor 354, which may have, by way of example, a value of 50 k ohms. The resistor 354 is connected to the lead 356. A negative 12 volt D C power source is connected to the lead 356 via a lead 358.

The operation of the circuit 300 shown in FIG. 2 for direction control of an object will now be described. As shown in FIG. 2, the brush 102 is initially in position C $c_2$. The potential on the brush 102 is sensed by lead 302 to the voltage sensitive motor direction controls 308 and 310. Rotation of the motor 12 causes the rack 22 to move as is shown in FIG. 6 and as has been previously described.

If, for esample. key A is closed the potential fed to the conductor A via lead 248 will be 10 volts and the potential on the brush 102 will be relatively low or negative. This potential will be sensed by the voltage sensitive motor direction controls 308 and 310 and the motor 12 will be driven in a forward direction. If, for example key E is closed, instead of key A, the potential fed to the conductor E via lead 248 will be 10 volts and the potential on the brush 102 will be relatively high or positive. This relatively high or positive potential will be sensed by the voltage sensitive motor direction controls 308 and 310 and the motor 12 will be driven in a reverse direction or in a direction oppsite to the direction described for the case of closing key A. If, for example, key C is closed, the potential on the brush 102 will be the same as that of key C and the direction control circuit will not operate.

When the circuit 300 is operated in a direction control mode, the C/D relay 306 comes on automatically hereby stopping the operation of the position control system previously described. After a delay of 0.05 seconds the armature 318 will move from the contact 304 to the contact 314 and the arnature 336 will move from the contact 332 to the contact 334. This enables the position control system 10 to be operated as previously described and restores the circuit configuration 300 shown in FIG. 2 to the circuit configuration 100 shown in FIG. 1.

FIGS. 4 and 5 show the operation of the circuit 100 of the position control system 10 in the process of stopping an object not shown which is in motion. In FIG. 4 the position control system 10 is shwon moving an object from right to left with the brush 102 therefore also moving from right to left as shown by the arrow 400. For the purpose of explanation it is assumed that it is desired to stop the object at the A $a_2$ position. Accordingly, key A and key $a_2$ have been closed as is shown in FIGS. 4 and 5. In FIG. 4 the upper portion 104 of the brush 102 is shown just making contact with contact $a_2$ thus permiting current to flow from the 10 volt D C source, which is connected to lead 248, through the key A, the contact A the brush 102 the contact $a_2$, the key $a_2$ and the lead 142 which is connected to the voltage sensitive motor speed control 150. During motion of the brush 102 from right to left the pulley 16 and the insulated plate 72 rotate in a clockwise direction as indicated by the arrow 402 in FIGS. 4 and 5. The lock key 30 slides over the stopper 32 as shown in FIG. 4 and the pulley 16 continues to rotate. When the voltage sensitive motor speed control 150 receives a stop signal via lead 142 it activates the stopper 32 via lead 404 for the purpose of engaging the lock key 30. When the lock key 30 comes into contact with the stopper 32, as is shown in FIG. 5, the pulley 16 continues to revolve just a little distance further until the lock key 30 comes into contact with the wall of the slot 60 in the lock plate 52. This additional rotation compensates for the backlash between the gears in the gear box 18 so that the position error due to backlash is minimized. At this time the ground copper black 74 which is mounted on the insulated plate 72 comes into contact with the stop signal brush 76 which may be mounted an the gear box 18 or on another convenient fixed support and completes a circuit via lead 406 to the voltage sensitive motor speed control 150 which, in turn, stops the motor 12. The surplus torque of the motor 12 is absorbed by the slide friction plate 40.

FIG. 3 shows the control circuit 450 for the rotary position control system 452 embodiment of FIG. 7. In order to facilitate the explaination of the control circuit 450 it is assumed, by way of example, that the control circuit 450 comprises a first set of 8 conductiors which are designated H, I, J, K, L, M, N and O has three oppsitely disposed conductors designated: $h_1$, $h_2$, $h_3$, $i_1$, $i_2$, $i_3$, $j_1$, $j_2$, $j_3$, $k_1$, $k_2$, $k_3$, $L_1$, $L_2$, $L_3$, $m_1$, $m_2$, $m_3$, $n_1$, $n_2$, $n_3$, $o_1$, $o_2$, and $o_3$. FIG. 3 shows the conductors disposed in a linear array similar to that of FIGS. 1 and 2. It is to be understood that this has been done only to simiplify the drawing and to facilitate the explaination of the circuit 450. The conductors in practice are disposed in a circular array encircling a central shaft on which a positioning brush 454 is mounted, this central shaft may be connected to, or may be the same as the shaft 456 on which the object 458 which is subjected to rotary motion is mounted. Also, in order to simplify the drawing; the connectors: H, I, J, K, L, $h_1$, $h_2$, $h_3$, $i_1$, $i_2$, $i_3$, $j_1$, $j_2$, $j_3$, $k_1$, $k_2$, $k_3$, $L_1$, $L_2$, and $L_3$ have been shown in solid lines and, the remaining conductors M and N have been indicated by broken lines 460 and 462, the remaining conductors: $m_1$, $m_2$, $m_3$, $n_1$, $n_2$, $n_3$, $o_1$, $o_2$, and $o_3$ have been indicated figuratively by the broken line 464. A fragment of the conductor O has been shown. The explaination of the circuit connections will be directed to the connectors which are shown in solid lines, with understanding that the circuit connections for the connectors which are not shown is similar.

A direction sensing brush 466 is mounted on the same shaft 456 as the positioning brush 454 and is spaced apart from the positioning brush 454 a distance which permits the direction sensing brush 466 to be centered on the J conductor when the positioning brush 454 is centered on the K conductor.

The conductors $h_1$, $h_2$, $h_3$, $i_1$, $i_2$, $i_3$, $j_1$, $j_2$, $j_3$, $k_1$, $k_2$, $k_3$, $L_1$, $L_2$, and $L_3$ are connected to the leads 480, 482, 484 the following manner:

Conductor $h_1$ is connected to lead 480 via lead 486,
Conductor $h_2$ is connected to lead 482 via lead 488,
Conductor $h_3$ is connected to lead 484 via lead 490,
Conductor $i_1$ is connected to lead 480 via lead 492,
Conductor $i_2$ is connected to lead 482 via lead 494,
Conductor $i_3$ is connected to lead 484 via lead 496,
Conductor $j_1$ is connected to lead 480 via lead 498,
Conductor $j_2$ is connected to lead 482 via lead 500,
Conductor $j_3$ is connected to lead 484 via lead 502,
Conductor $k_1$ is connected to lead 480 via lead 504,
Conductor $k_2$ is connected to lead 482 via lead 506,
Conductor $k_3$ is connected to lead 484 via lead 508,
Conductor $L_1$ is connected to lead 480 via lead 510,
Conductor $L_2$ is connected to lead 482 via lead 512 and
Conductor $L_3$ is connected to lead 484 via lead 514.

Each of the conductors $h_1$, $h_2$, $h_3$, $i_1$, $i_2$, $i_3$, $j_1$, $j_2$, $j_3$, $k_1$, $k_2$, $k_3$, $L_1$, $L_2$ and $L_3$ is connected to a switch or key with the keys being designated to correspond with the designation of the conductors, with for example, key $h_1$ corresponding to conductor $h_1$, key $h_2$ corresponding to conductor $h_2$ and so on in order.

Each of the keys $h_1$, $h_2$, $h_3$, $i_1$, $i_2$, $i_3$, $j_1$, $j_2$, $j_3$, $k_1$, $k_2$, $k_3$, $L_1$, $L_2$ and $L_3$ is connected to a lead which is connected to a resistor via lead 524. The resistor 522 may have a volue, by way of example, in the order of 4 k ohms. The resistor 522 is connected via lead 526 to relay contact 528 of the relay 530. Relay cotact 532 of the relay 530 is connected to the direction sensing brush 466 via lead 534. The lead 520 is also connected to relay contact 536 of relay 538, and the relay contact 540 is connected to lead 542 via lead 544.

Between adjacent connectros $j_1$ and $j_2$ there is disposed a diode 546 and a resistor 548. The resistor 548 may have a volue by way of example of 2 k ohms. Similarly between connectors $j_2$ and $j_3$ there is disposed a diode 550 and a resistor 552. For purposes of drawing clarify only the diodes 546, 550 and the resistors 548 552 are shown, it being understood that between each pair of adjacent conductors such as $h_1$ and $h_2$ there is a similar diode and a similar resistor connected in a similar manner. Between connectors $j_1$ and $j_3$ there is disposed a relay contact 554, a resistor 556 and a diode 558. For purposes of drawing clarify only the relay contact 554 the resistor 556 and the diode 558 are shown, it being understood that between the first and third of each group of conductors, such as between conductors $h_1$ and $h_3$, there is a similar relay contact, a similar resistor and a similar diode connected in a similar manner.

The size and spacing of the conductors H, I, J, K, L is such that, in a manner similar to that whaich has been described for the embodiment shown in FIGS. 1 and 2, the ends 560, 562 of conductor H are in general alignment with opposing ends 564 and 566 of conductors $h_1$ and $h_3$. In general, the ends of each of the conductors designated by a capital letter are in general alignment with the extreme opposing ends of the first and third conductors designated by a corresponding lower case letter.

The arrangement is such that when for example the position brush 454 is in contact with the edge 568 of conductor k it is also in cotact with the conductor $k_1$.

Connected between each of the adjacent conductors: H, I; I, J; J, K; K, L; L, M; M, N; N, O and O, A there is a resistors may have a value, by way of example, of 10 kΩ. As indicated previously only the conductors H, I, J, K, L and a fragment of conductor O are shown in FIG. 3. The resistors and diodes connecting the adjacent connectors are 570, 572, 574, 576 and 578, 580, 582, 584, 586 and 588, respectively.

Each of the conductors H, I, J, K and L are connected to a switch or key via leads 592, 594, 596, 598 and 600, respectively, with the keys being designated by capital letters corresponding to the conductors, so that for example, key I. The keys H, I, J, K and L are each connected to the lead 542 via leads 602, 604, 606, 608, 610, respectively.

The lead 542 is connected to a 10 volt D C power source via relay contact 612 and arnature 614 which are connected to lead 616.

Lead 534 from the direction sensing brush 466 is connected to the voltage sensitive motor direction control 618 via a normally closed relay 620 and lead 622. The voltage sensitive motor direction control 618 is connected to the universal motor 624 via leads 626 and 628. The voltage sensitive motor direction control 618 is connected to an external 20 volt source of D C power via the lead 630. Leads 520 and 544 are alternatively connected to lead 632 via lead 634 which is connected to resistor 636 which is connected ground 638 in accordance with the position of the arnature 640 of relay 538. The resistor 636 may have a value, by way of example, in the order of 15 k ohms. The lead 632 is also connected to a voltage sensitive motor speed control 642, which is disposed for high speed motor operation, a voltage sensitive motor speed control 644, which is disposed for intermediate speed motor operation, a voltage sensitive motor speed control 646 which is disposed for low speed motor operation and a voltage sensitive motor stop control 648 which is disposed to stop the motor 624.

For the purpose of explanation it is assumed that the positioning brush 454 is initially at contact k, as is shown in FIG. 3, and it is desired to move the positioning brush 454 to contact H. The key H is closed and the 10 volt D C power source supplies power which flows, in order stated, through the closed key H, conductor H, diode 578, resistor 570, conductor I, diode 580, resistor 572 conductor J, direction sensing brush 466, lead 534 relay 530. Lead 622 finally to the voltage sensitive motor direction control 618. The voltage sensitive motor direction control 618 upon sensing the voltage from the 10 volt D C power source couses the motor 624 to reverse the direction of rotation.

The motor rotates normally in a clockwise direction which is considered the forward direction. If the direction sensing brush 466 is on conductor J as shown in FIG. 3 and it desired to move the positioning brush 534 from conductor k to conductor L, the current from the 10 volt D C power source can not pass through conductors L, K and J because of the polarily of diodes 582 and 584 but it can pass through conductors L, M, N and O and than through contructors H, I, J through the direction sensing brush 466, lead 534, relay 530, lead 622 and finally to the voltage sensitive motor direction control 618. Because the overall resistance of the above circuit path exceeds 30 k ohms. The current will be weaker than a preselected value and the voltage sensitive motor direction control 618 will not operate to reverse the direction of the motor 624 and the motor 624 will operate in the forward direction.

If the operator closes key K, the voltage sensitive motor direction control will not operate 618. After a delay in the order of 0.05 seconds relay arnature 644 will move from contact 532 to 528. If it is desired to move the positioning brush to position K $k_3$ then key $k_3$ is colsed, the voltage sensitive motor direction control 618 will not operate and the motor 624 will rotate in a forward direction. If is desired instead to move the positioning brush 454 from position K $k_2$ to position K $k_1$ then key $k_1$ is closed, the voltage sensitive motor direction control 618 will be operated and the motor 624 will run in the reverse direction.

If the positioning brush 454 is on position K $k_2$ and it is desired to move the positioning brush 454 to position L$l_3$ than as indicated above the motor 624 will run in the forward direction, and the current will pass through key L a diode 586, a resistor 516, the positioning brush 454 and finally through key $L_3$ before it reaches the voltage sensitive motor speed controls 642, 644 and 646 the motor sensitive motor stop control 648 which control the positioning brush in a manner similar to that described for the first embodiment of the invention which provided linear motion.

If the positioning brush is on position K $k_2$ and it is desired to move the positioning brush to position H $h_2$ then the motor will rotate in the reverse direction and relays 645 and 530 will be energized. The 10 volt D C electric current will pass through relay 645 to contact $h_1$, a diode and a resistor which are not shown but which correspond to the diode 546, and the resistor 548, then through the positioning bruch, 545 connector K through diode 582, resistor 572 and the corresponding components of contacts J, I and H, through key H and through contact 540 of relay 538 and than back to the voltage sensitive motor speed controls 642, 644, 646 and 648 and the voltage sensitive motor stop stop control 618 which controls the speed and the stopping of the systems 10 in a manner similar to that previously described.

A latitude of modification, substitution and change is intended in the foregoing disclosure, and in some instances, some features of the present invention may be employed without a corresponding use of other features.

What is claimed is:

1. A position control systme for subjecting an object to motion in a controlled manner comprising a base, a universal electric moter mounted a said base, gear box means having input and output means, with gear box means providing a selected ratio of speed between motion of said input and said output means, driving connection means connection said universal electric motor and said gear box means, connecting means for connecting said object to said output means of said gear box means, control circuit means with said control circuit means comprising a plurality of voltage sensitive motor controls connected to said universal electric motor, a first plurality of spaced electrical conductors, a second plurality of spaced electrical conductors with said second plurality of spaced electrical conductors disposed opposite said first plurality of spaced electrical conductors, a movable conductive brush disposed for motion responsive to motion of said object and disposed to connect opposite conductors of said first and said second pluralities of spaced electrical conductors, first electrical resistance means connecting said first plurality of spaced electrical conductors, second electrical resistance means connecting said second plurality of spaced electrical conductors circuit connection means connecting said first and said second electrical resistance means, a source of direct current power connected to said circuit connection means, a plurality of switch means disposed one each, connecting said first plurality of conductors with said first electrical resistance means and connecting said second plurality of conductors with said second electrical resistance means so that closing selected switches of said plurality of said switch means causes selected resistance resistance values to be electrically connected within said control circuit resulting in selected voltages being sensed by said boltage sensitive motor controls thereby causing said universal electric motor to drive said object to a position corresponding to said selected switches, a pulley mounted on said input means on said gear box means, a drive belt connecting said pulley and said universal electric motor, comprising a pair of plates, a slip-friction layer disposed between said plates and fastened to a first of said pair of plates and fastened to a first of said pair of plates, with said first plate connected to said drive belt and with said second plate connected to said input means on said gear box means and spring loading means disposed to urge said pair of plates into contact so that roque in excess of a predetermined value causes said pair of plates of slip relative to each other thereby preventing damage to said position control system.

2. A position control system according to claim 1 in whic said pulley further includes a control shaft; a lock plate with said lock plate mounted on said control shaft and a lock key rotatably mounted on said control shaft with said lock key proportioned narrower than the width of said that and with said lock key disposed within said slot and movable within the confines of said slot and with said lock key having an outer and projecting beyond said pulley.

3. A position control system according to claim 2 in which which said pulley further comprises a plate mole of an electrically insulating material and an electrical contact pad disposed on selected location on said plate.

4. A position control system according to claim 3 which further comprises electeically operated stop means mounted on said base and disposed to engage said outer end of said lock key, a stop sensing brush mounted on said base and disposed for contact with said electrical contact pad when said lock key is engaged by said electrically operated stop means and electrical connections for transmitting a stop signal to said universal electric motor hen said stop means engage said lock key and said stop sensing brush contacts said electrical contact pad.

* * * * *